United States Patent
Wu et al.

(10) Patent No.: US 10,025,131 B2
(45) Date of Patent: Jul. 17, 2018

(54) TOUCH-SENSING LIQUID CRYSTAL PANEL AND FABRICATION METHOD THEREOF

(71) Applicant: HannStar Display Corporation, Taipei (TW)

(72) Inventors: Hsu-Ho Wu, Tainan (TW); Ping-Yuan Su, Kaohsiung (TW); Yu-Cheng Lin, Pingtung County (TW); Hsing-Ying Lee, Tainan (TW); Kun-Hua Tsai, Tainan (TW)

(73) Assignee: HannStar Display Corporation, Taipei (TW)

(*) Notice: Subject to any disclaimer, the term of this patent is extended or adjusted under 35 U.S.C. 154(b) by 138 days.

(21) Appl. No.: 15/143,634

(22) Filed: May 2, 2016

(65) Prior Publication Data

US 2016/0246112 A1 Aug. 25, 2016

Related U.S. Application Data

(62) Division of application No. 14/187,312, filed on Feb. 23, 2014, now Pat. No. 9,355,807.

(30) Foreign Application Priority Data

Jun. 24, 2013 (CN) .......................... 2013 1 0251795

(51) Int. Cl.
G02F 1/1333 (2006.01)
H01J 9/20 (2006.01)
(Continued)

(52) U.S. Cl.
CPC ........ G02F 1/13338 (2013.01); G02F 1/1341 (2013.01); G02F 1/1368 (2013.01);
(Continued)

(58) Field of Classification Search
None
See application file for complete search history.

(56) References Cited

U.S. PATENT DOCUMENTS

| 8,284,332 B2* | 10/2012 | Geaghan | ................... | C23F 1/14 |
| | | | | 349/12 |
| 2003/0122799 A1 | 7/2003 | Yu | | |

(Continued)

FOREIGN PATENT DOCUMENTS

| CN | 1649096 A | 8/2005 |
| CN | 1890788 A | 1/2007 |

(Continued)

*Primary Examiner* — James Dudek
(74) *Attorney, Agent, or Firm* — CKC & Partners Co., Ltd.

(57) ABSTRACT

A touch-sensing liquid crystal panel and a fabrication method thereof are provided. The touch-sensing liquid crystal panel includes a color filter substrate and a transistor substrate. In the fabrication method, at first, a first glass substrate is provided. Thereafter, a sensing matrix is formed on a first surface of the first glass substrate at a baking temperature. The sensing matrix is formed from indium tin oxide (ITO), and a sheet resistance of the sensing matrix is equal to or less than 30 ohm/square. Then, color filters and a common electrode are disposed on a second surface of the first glass substrate to form a color filter substrate, wherein the second surface is opposite to the first surface. Thereafter, the transistor substrate is provided and combined with the color filter substrate. Thereafter, a slimming process is performed to slim a second glass substrate of the transistor substrate.

20 Claims, 9 Drawing Sheets

(51) Int. Cl.
    *G06F 3/041*        (2006.01)
    *G02F 1/1335*     (2006.01)
    *G02F 1/1343*     (2006.01)
    *G02F 1/1368*     (2006.01)
    *G06F 3/047*        (2006.01)
    *G02F 1/1341*     (2006.01)

(52) U.S. Cl.
    CPC .... *G02F 1/13439* (2013.01); *G02F 1/133516* (2013.01); *G02F 1/133528* (2013.01); *G06F 3/041* (2013.01); *G06F 3/047* (2013.01); *G06F 3/0412* (2013.01); *H01J 9/205* (2013.01); *G02F 2001/133302* (2013.01); *G02F 2201/50* (2013.01); *G06F 2203/04103* (2013.01)

(56) References Cited

U.S. PATENT DOCUMENTS

| | | |
|---|---|---|
| 2013/0155059 A1 | 6/2013 | Wang et al. |
| 2014/0015764 A1 | 1/2014 | Arola et al. |
| 2014/0016043 A1 | 1/2014 | Chen et al. |
| 2015/0103268 A1 | 4/2015 | Watanabe |

FOREIGN PATENT DOCUMENTS

| | | |
|---|---|---|
| CN | 101201490 A | 6/2008 |
| CN | 102016766 A | 4/2011 |
| CN | 102650752 A | 8/2012 |

\* cited by examiner

TOUCH-SENSING LIQUID CRYSTAL PANEL AND FABRICATION METHOD THEREOF

RELATED APPLICATIONS

This application is a divisional application of U.S. application Ser. No. 14/187,312, filed on Feb. 23, 2014, which claims priority to Chinese Application Serial Number 201310251795.9, filed Jun. 24, 2013. The entire disclosures of all the above applications are hereby incorporated by reference herein.

BACKGROUND

Field of Invention

The present invention relates to a touch-sensing liquid crystal panel and a fabrication method thereof. More particularly, the present invention relates to a touch-sensing liquid crystal panel having a touch-sensing matrix using On Cell technology and a fabrication method thereof.

Description of Related Art

In recent years, thin and light flat panel displays become popular displays used in various electronics. In order to enable information products to achieve the objects of convenient usage, concise appearance, and multiple functions, many information products use touch panels as input devices instead of traditional keyboards, mice, etc.

With rapid development flat display and touch panel technologies, some electronic products combine the touch panel with a display panel to form a touch-sensing display panel, so as to provide users with a greater viewable screen area and more convenient operation modes under the condition of limited volumes. Because the touch-sensing display panel has the display function of the display panel and convenience of input operation of the touch panel, the touch-sensing display panel has gradually become an important component applied in many electronic products such as a handheld PC, a personal digital assistance (PDA), or a smart phone.

The operation principle of the touch panel is based on that, when a conductor object (such as a finger) touches a touch-sensing matrix of the touch panel, an electrical property (such as electrical resistance or capacitance) of the touch-sensing matrix is changed accordingly to result in a change of a bias voltage applied on the touch-sensing matrix. The change of the electrical properties is converted to a control signal outputted to an external control circuit board, and then a processor performs data calculation in accordance with the control signal to obtain a result. Thereafter, the external control circuit board outputs a display signal to the display panel, and an image is presented to users through the display panel.

In the current various technologies of touch panels, On Cell technology is one of the most popular technologies, because the On Cell technology has advantages of low cost and convenience for assembling. In the On Cell technology, a sheet resistance of the touch-sensing matrix affects the performance of touch-sensing operation. For example, if a touch-sensing matrix has a greater sheet resistance, a touch-sensing driver circuit of the touch-sensing matrix needs more power to perform the touch-sensing operation.

Therefore, there is a need to provide touch-sensing liquid crystal panel and a fabrication method thereof having a sensing matrix with a lower electrical resistance.

SUMMARY

Therefore, an aspect of the present invention provides a touch-sensing liquid crystal panel and a fabrication method thereof. The fabrication method uses high temperature baking technology to form a sensing matrix with lower electrical resistance to provide the touch-sensing liquid crystal panel having better touch-sensing performance.

According to an embodiment of the present invention, the touch-sensing liquid crystal panel includes a color filter substrate, a transistor substrate and a liquid crystal layer. The color filter substrate includes a first glass substrate, a sensing matrix, color filters and a common electrode layer. The first glass substrate has a first surface and a second surface, wherein the first surface is opposite to the second surface. The sensing matrix is disposed on the first surface of the first glass substrate, wherein the sensing matrix is formed from indium tin oxide (ITO), and the sensing matrix has a sheet resistance smaller than or equal to 30 ohm/square. The color filters are disposed on the second surface of the first glass substrate. The common electrode layer is disposed on the color filters. The transistor substrate includes a second glass substrate and a pixel layer. The second glass substrate is treated by a slimming process and has a thickness smaller than 0.2 mm. The pixel layer is disposed on the second glass substrate, wherein the pixel layer includes pixel units, and each of the pixel units includes a switching transistor and a pixel electrode. The liquid crystal layer is disposed between the color filter substrate and the transistor substrate.

According to another embodiment of the present invention, in the fabrication method of the e touch-sensing liquid crystal panel, at first, a color filter substrate is fabricated. In the operation for fabricating the color filter substrate, at first, a first glass substrate is provided, wherein the first glass substrate has a first surface and a second surface, and the first surface is opposite to the second surface. Thereafter, a sensing-matrix-forming step is performed to form a sensing matrix on the first surface of the first glass substrate at a predetermined process temperature, wherein the sensing layer is formed from indium tin oxide and a sheet resistance of the sensing layer is smaller than or equal to 30 ohm/square. Then, filters are formed on the second surface of the first glass substrate. Thereafter, a common electrode layer is formed on the color filters to form the color filter substrate. After the step for fabricating the color filter substrate, a transistor substrate is provided. The transistor substrate includes a second glass substrate and a pixel layer. The pixel layer is formed on the second glass substrate, wherein the pixel layer includes pixel units, and each of the pixel units includes a switching transistor and a pixel electrode. Then, the color filter substrate is combined with the transistor substrate and a liquid crystal layer is formed between the color filter substrate and the transistor substrate to form a liquid crystal panel. Thereafter, a slimming process is performed on the liquid crystal panel to slim the second glass substrate of the liquid crystal panel.

It can be understood from the above descriptions that the fabrication method of the touch-sensing liquid crystal panel forms a sensing matrix with a sheet resistance equal to or smaller than 30 ohm/square, so as to provide the touch-sensing liquid crystal panel having better performance on touch-sensing. In addition, one side of the touch-sensing liquid crystal panel is slimed to enable the touch-sensing liquid crystal panel to be thinner and lighter.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Reference will now be made in detail to the present preferred embodiments of the invention, examples of which are illustrated in the accompanying drawings. Wherever possible, the same reference amounts are used in the drawings and the description to refer to the same or like parts.

Referring to FIG. 1 and FIGS. 2a-2f, FIG. 1 is a flow chart showing a fabrication method 100 of a touch-sensing liquid crystal panel in accordance with an embodiment of the present invention, and FIGS. 2a-2f are cross-sectional views of the touch-sensing liquid crystal panel corresponding to the steps of the fabrication method 100. In the fabrication method 100, at first, a step 110 is performed for providing a color filter substrate. In this embodiment, the step 110 for providing the color filter substrate includes step 112 for providing a substrate, step 114 for forming a sensing matrix, step 116 for forming color filters and step 118 for forming a common electrode. In the following descriptions, the step 110 for providing the color filter substrate is described in detail.

Figure 1:
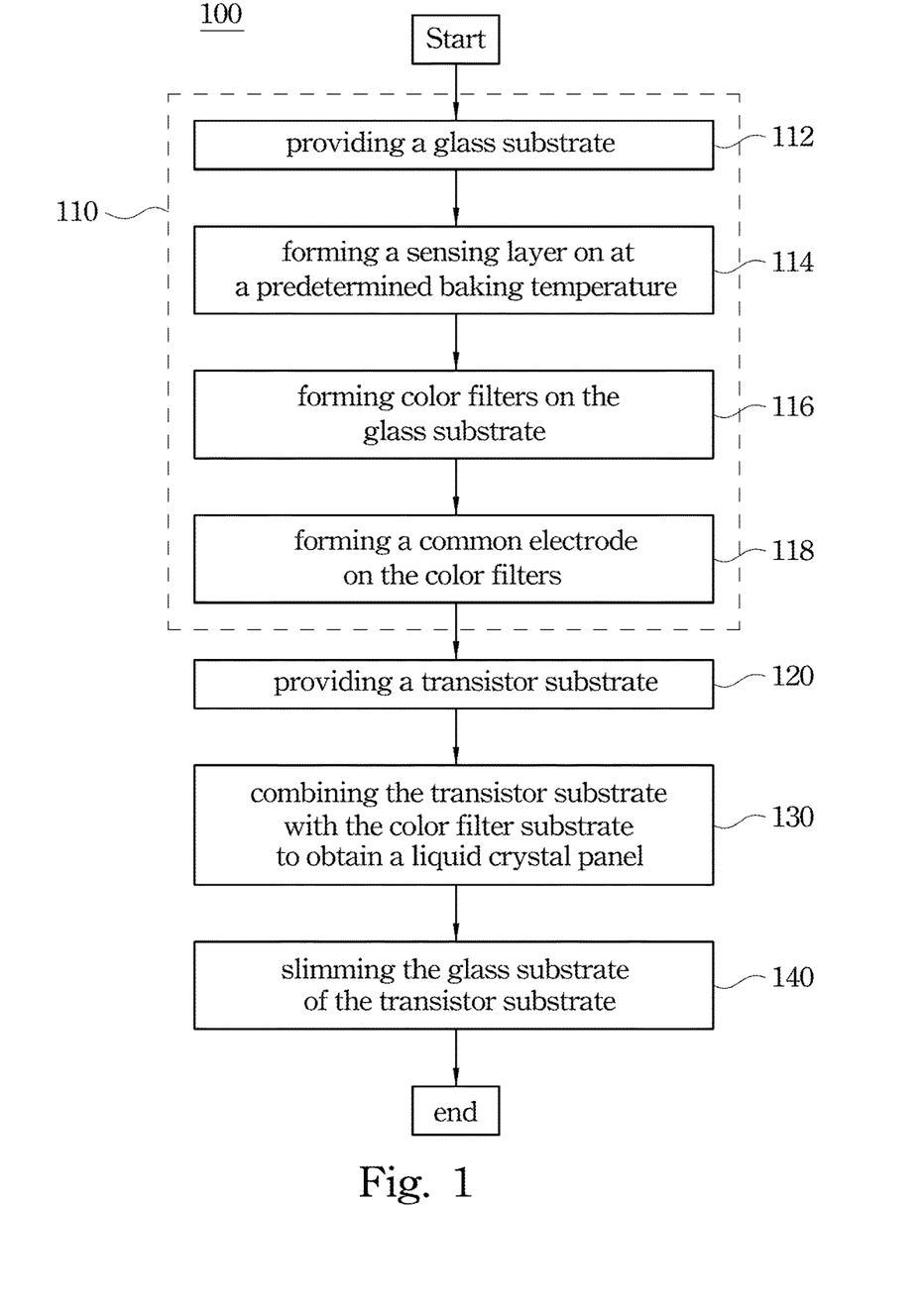
FIG. 1 is a flow chart showing a fabrication method of a touch-sensing liquid crystal panel in accordance with an embodiment of the present invention.
Figure 2A:
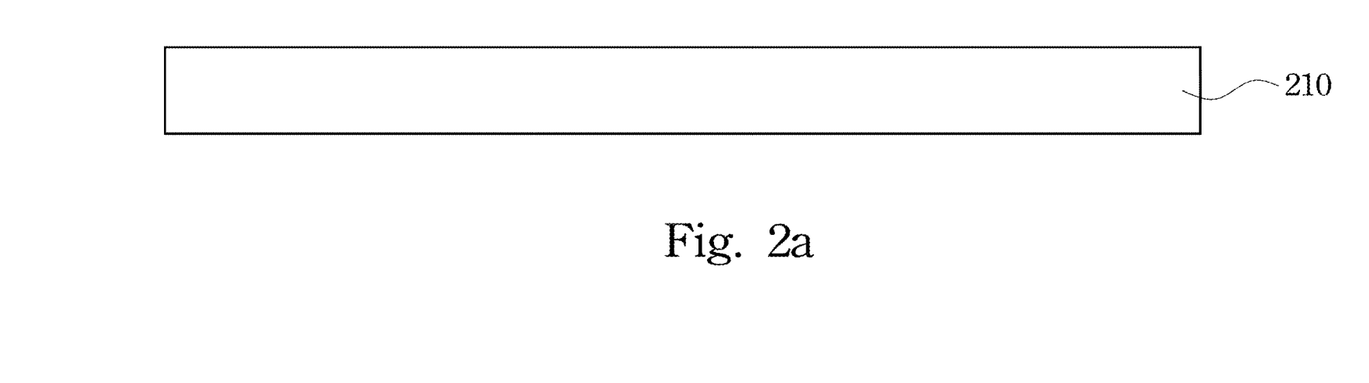
FIGS. 2a-2f are cross-sectional views of the touch-sensing liquid crystal panel corresponding to the steps of the fabrication method in accordance with an embodiment of the present invention.

In the step 110 for providing the color filter substrate, at first, the step 112 is performed to provide a glass substrate 210, as shown in FIG. 2a. The glass substrate 210 has a first surface 212 and a second surface 214, wherein the first surface 212 is opposite to the second surface 214.

Figure 2B:
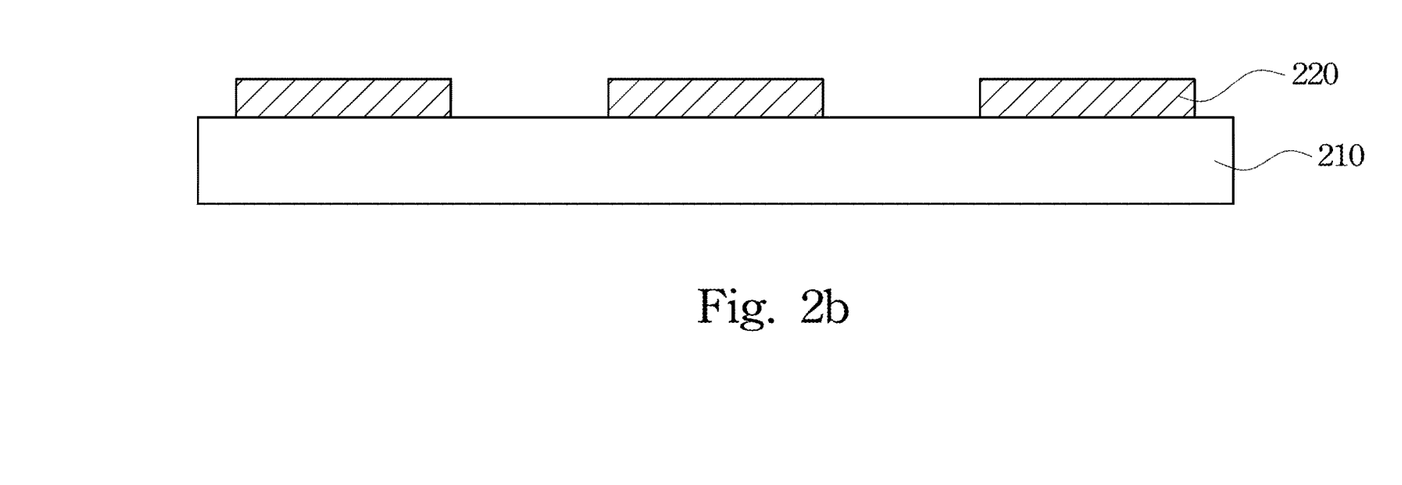
Figure 5:
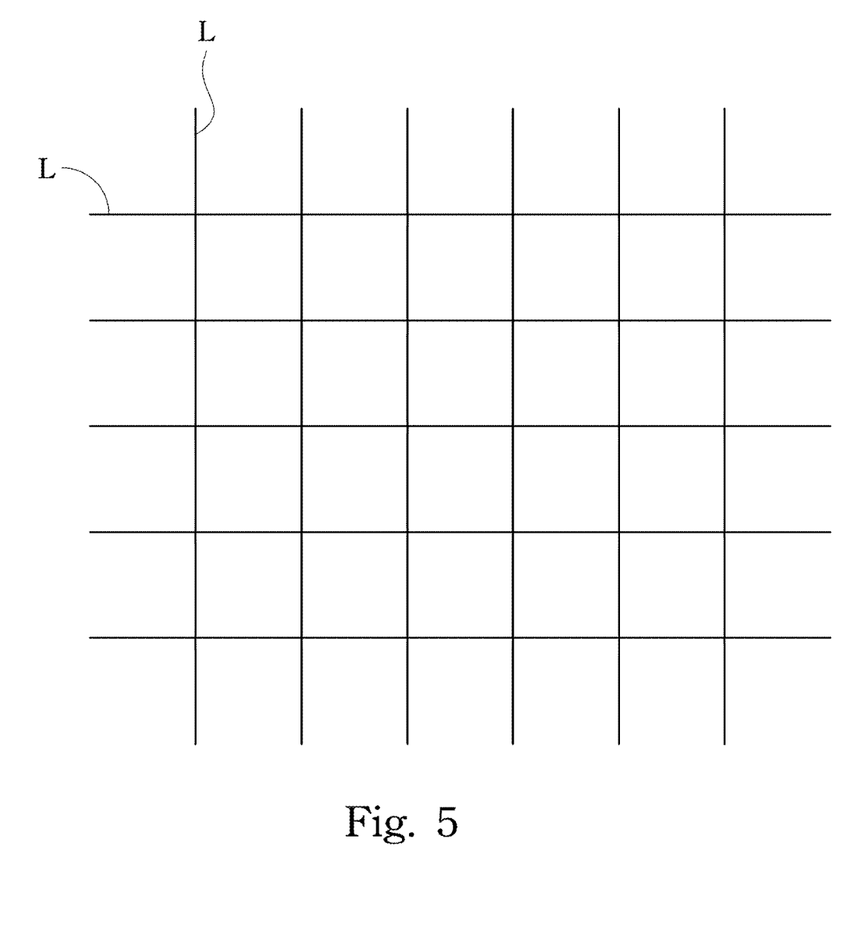
FIG. 5 is a structure diagram showing a pattern of the sensing matrix in accordance with an embodiment of the present invention.

Then, the step 114 for forming a sensing matrix is performed to form a sensing matrix 220 on the first surface 212 of the glass substrate 210 at a predetermined baking temperature, as shown in FIG. 2b. In this embodiment, the predetermined baking temperature is greater than 230° C., and a sputter technology is used to form the sensing matrix 220 on the glass substrate 210. However, embodiments of the present invention are not limited thereto. In addition, the sensing layer 220 is formed from indium tin oxide (ITO) and the sensing layer 220 has a thickness ranging from 600 Angstrom to 1400 Angstrom. The step 114 is performed for forming the sensing matrix 220 having a sheet resistance smaller than or equal to 30 ohm/square, thereby decreasing the power needed by a touch-sensing circuit for touch-sensing operation. In this embodiment, the pattern of the sensing matrix 220 id formed by using a photolithography process, and the sensing matrix 220 has perpendicular ITO lines L, as shown in FIG. 5. However, the shape of the pattern of the sensing matrix 220 is not limited thereto.

It is noted that the touch-sensing panel of this embodiment is fabricated by using On Cell technology, and thus only one mask is needed in the step 114 for forming the pattern of the sensing matrix 220.

Figure 2C:
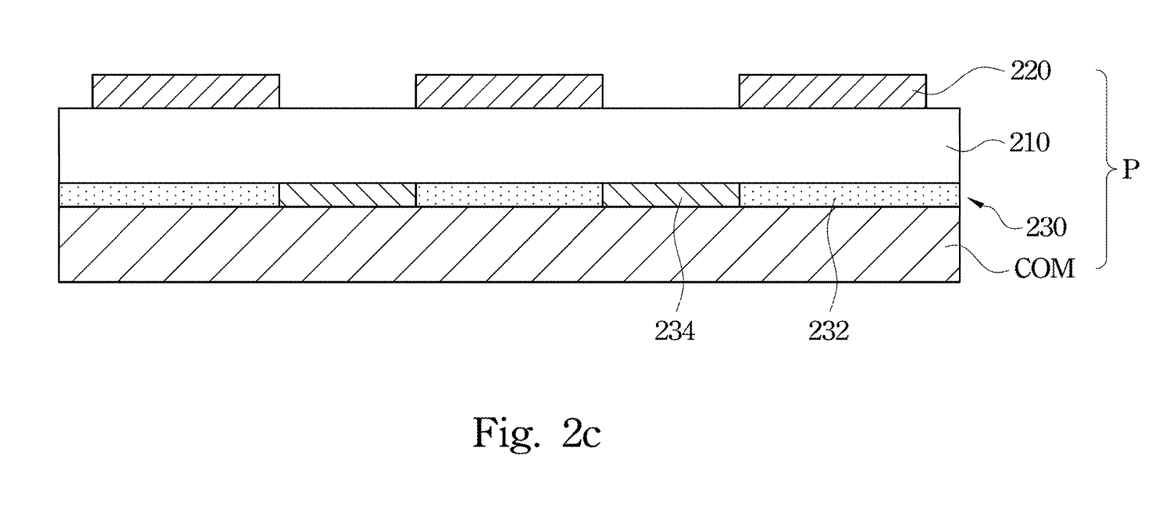

After, the step 114 for forming the sensing matrix, the steps 116 and 118 are sequentially performed to form color filters 230 and a common electrode COM on the second surface 214 to obtain a color filter substrate P, as shown in FIG. 2c. The color filters 230 include color resistors 232 and black matrixes 234. In this embodiment, the color resistors 232 include red resistors, blue resistors and green resistors, but embodiments of the present invention are not limited thereto. The common electrode COM is formed on the color filters 230, and thus the color filters 230 are disposed between the glass substrate 210 and the common electrode COM.

Figure 2D:
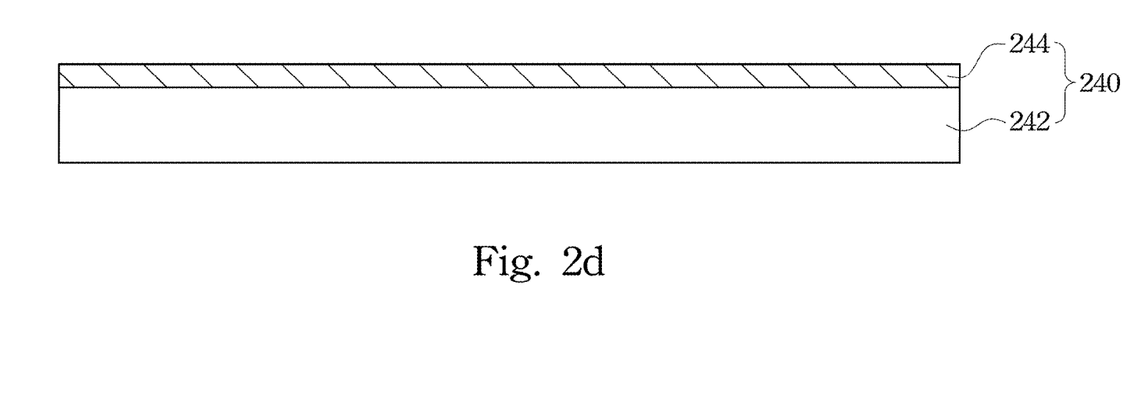

After the step 110 for providing the color filter substrate, a step 120 is performed for providing a transistor substrate 240, as shown in FIG. 2d. The transistor substrate 240 includes a glass substrate 242 and a pixel layer 244. The pixel layer 244 is formed on the glass substrate 242 and includes pixel units (not illustrated). Each of the pixel units includes switching transistors and a pixel electrode to sequentially receive image data signals to control alignment of liquid crystal molecules in a liquid crystal layer.

Figure 2E:
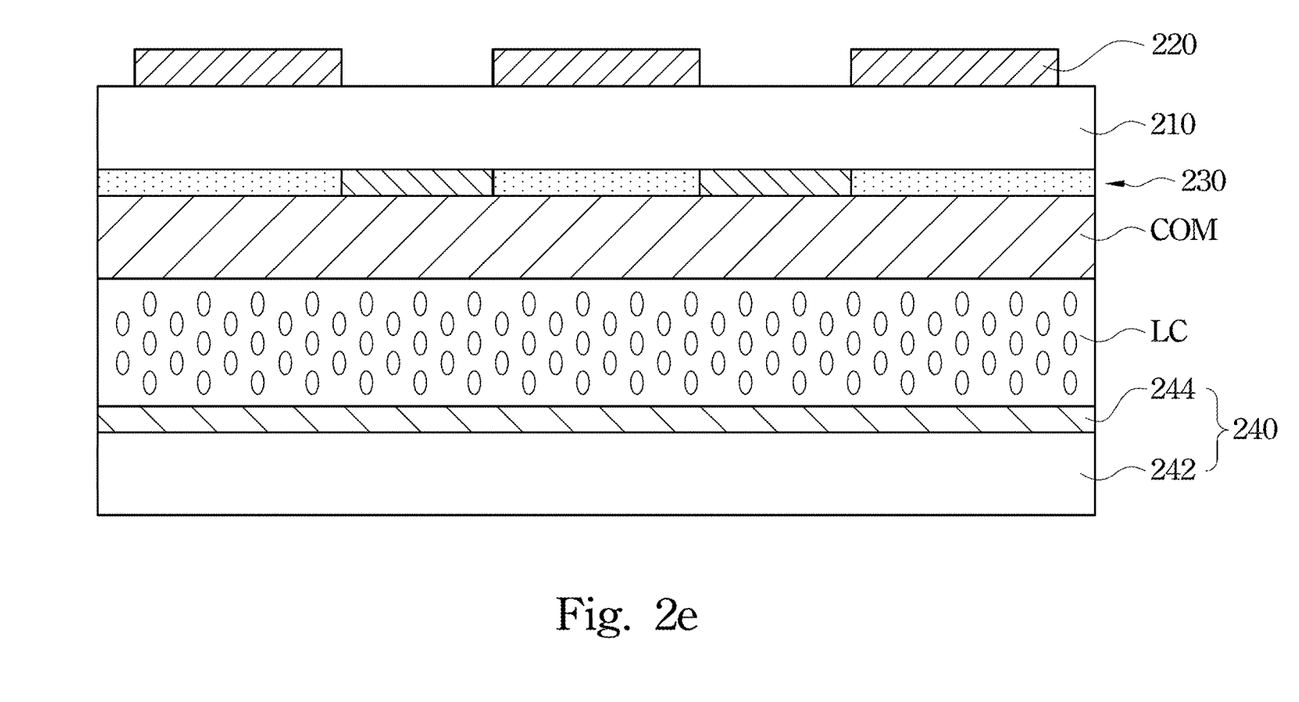

After the step 120 for providing the transistor substrate 240, a step 130 is performed to combine the transistor substrate 240 with the color filter substrate P and to dispose the liquid crystal layer LC between the transistor substrate 240 and the color filter substrate P to obtain a touch-sensing liquid crystal panel 200, as shown in FIG. 2e, wherein the common electrode COM of the touch-sensing liquid crystal panel 200 is located between the liquid crystal layer LC and the color filters 230. In this embodiment, the combination of the transistor substrate 240 and the color filter substrate P are performed by using a sealant, but embodiments of the present invention are not limited thereto.

Figure 2F:
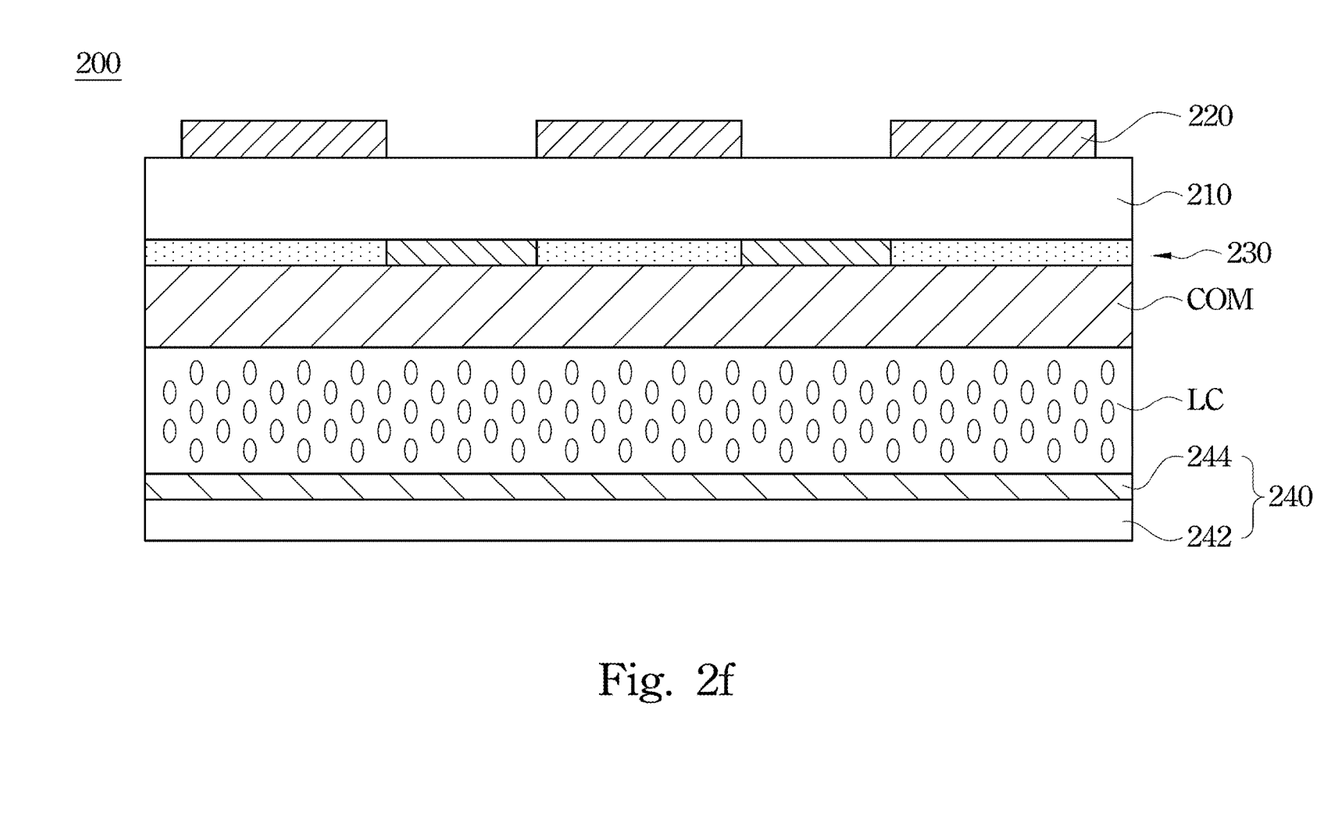

After the step 130 for combining the transistor substrate 240 with the color filter substrate P, a slimming step 140 is performed to slim the touch-sensing liquid crystal panel 200, as shown in FIG. 2f. In this embodiment, the slimming step 140 is performed on the glass substrate 242 of the transistor substrate 240 to reduce the thickness of the glass substrate 242 from 0.4 mm to 0.2 mm. In other words, the thickness of the glass substrate 242 is reduced 50%.

It can be understood from the above descriptions that the fabrication method 100 of the touch-sensing liquid crystal panel uses the step 114 to provide the sensing matrix 220 having a sheet resistance smaller than or equal to 30 ohm/square to decrease the power needed by a touch-sensing circuit for touch-sensing operation. In addition, the fabrication method 100 of the touch-sensing liquid crystal panel includes a slimming process to provide the thin and light touch-sensing liquid crystal panel 200.

Figure 3:
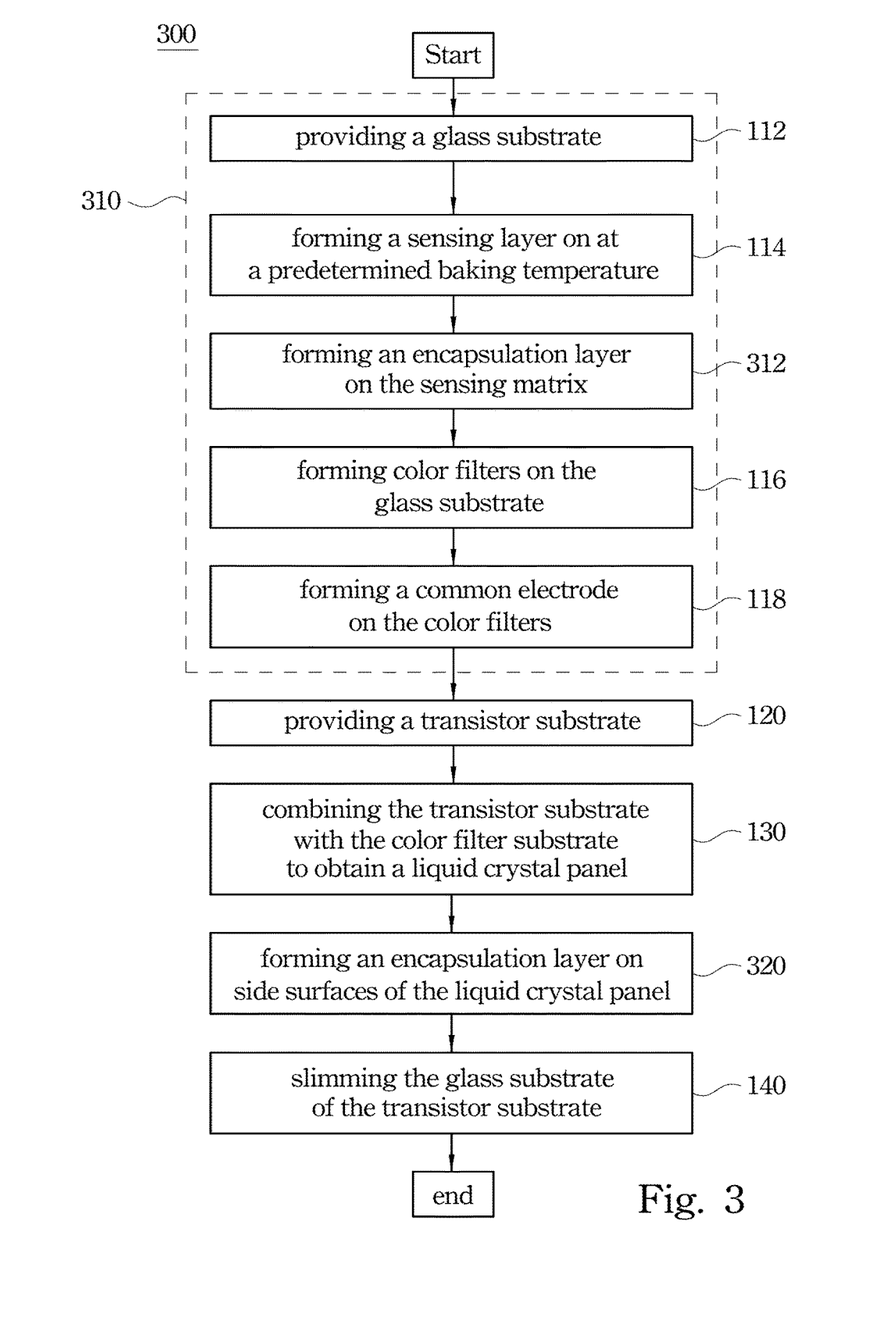
FIG. 3 is a flow chart showing a fabrication method of a touch-sensing liquid crystal panel in accordance with another embodiment of the present invention.

Referring to FIG. 3, FIG. 3 is a flow chart showing a fabrication method 300 of a touch-sensing liquid crystal panel in accordance with another embodiment of the present invention. The fabrication method 300 is similar to the fabrication method 100, but the difference is in that the fabrication method 300 further includes encapsulating steps 312 and 320.

Figure 4A:
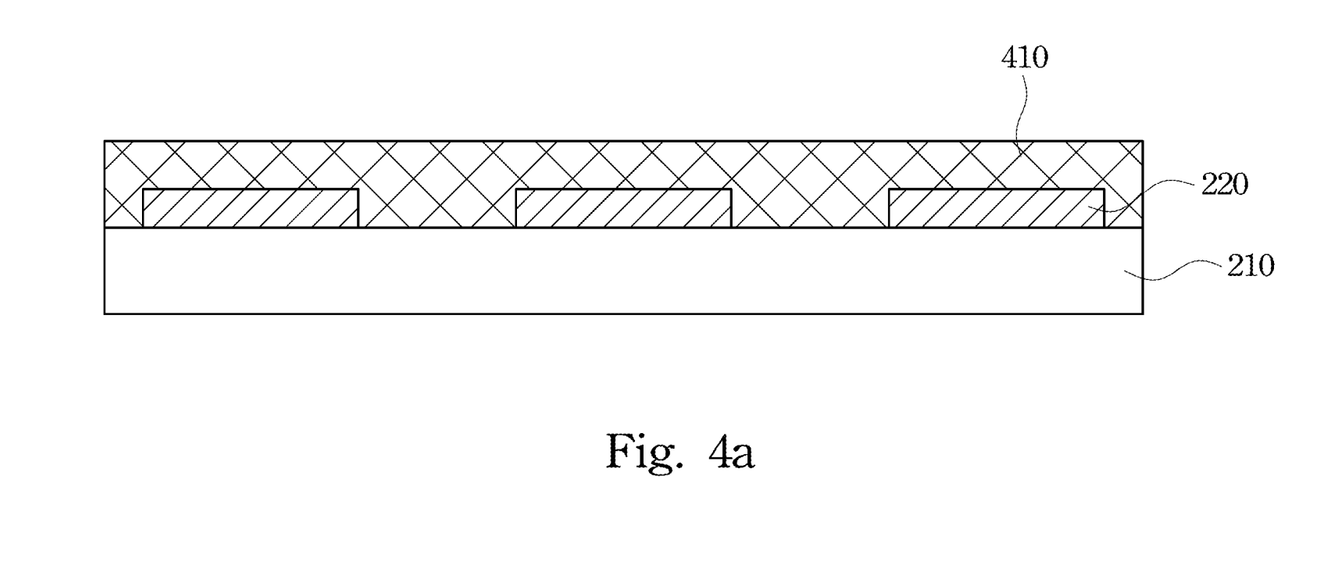
FIGS. 4a and 4b are cross-sectional views of the touch-sensing liquid crystal panel corresponding to the encapsulating steps of the fabrication method in accordance with an embodiment of the present invention.

The encapsulating step 312 in a step 310 for providing a color filter substrate is performed between the steps 114 and 116. The encapsulating step 312 is performed before the step 116 to form an encapsulation layer 410 on the sensing matrix 220, as shown in FIG. 4a. The encapsulation layer 410 is used to protect the sensing matrix 220 to prevent sensing matrix 220 from being damaged during following processes. In this embodiment, the encapsulation layer 410 is formed by using a peelable sealant, but embodiments of the present invention are not limited thereto.

Figure 4B:
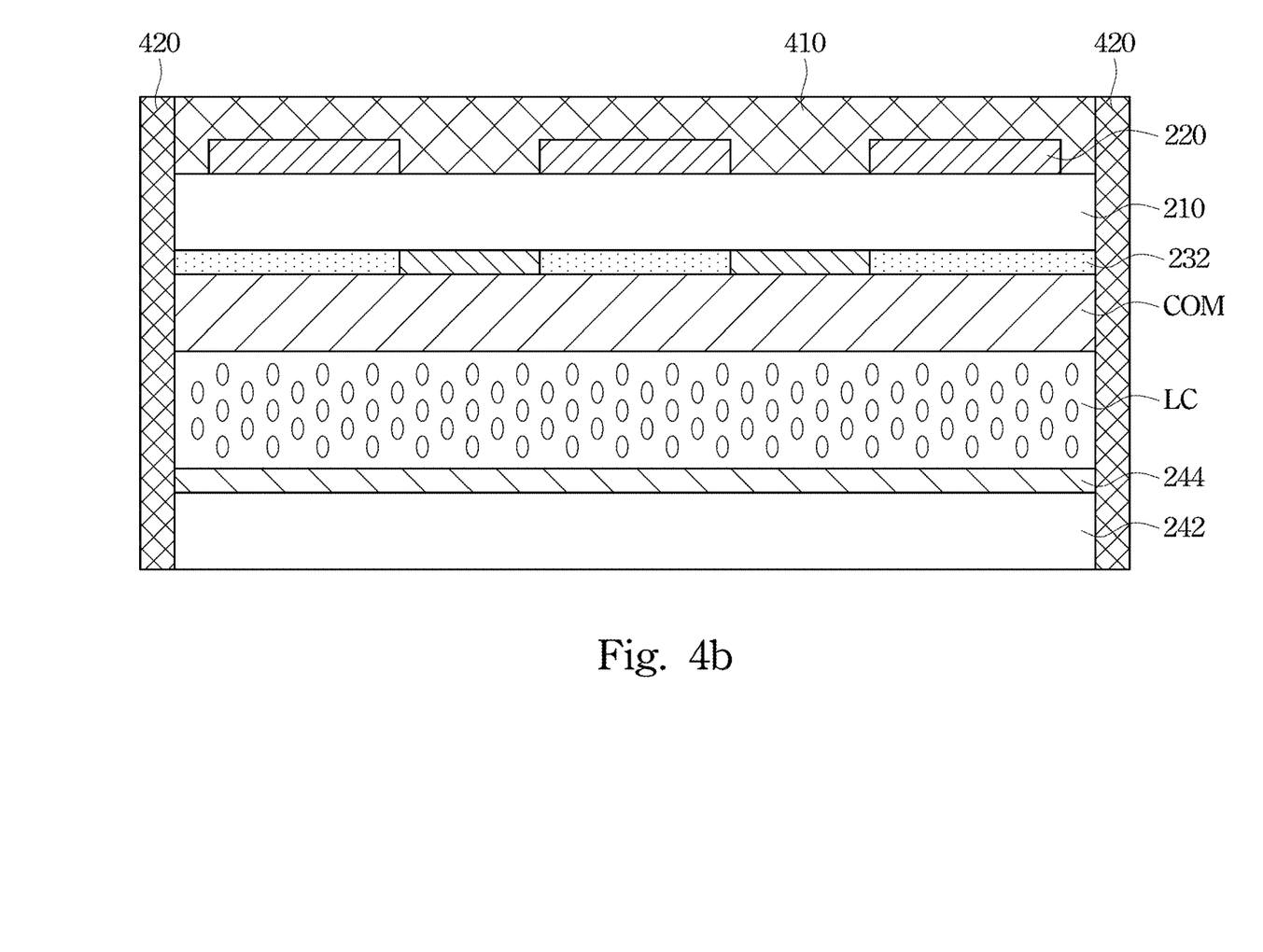

The encapsulating step 320 is performed between the combination step 130 and the slimming step 140. The encapsulating step 320 is performed before the slimming step 140 to form an encapsulation layer 420 on side surfaces of the touch-sensing liquid crystal panel to protect the side surfaces of the touch-sensing liquid crystal panel, as shown in FIG. 4b. The encapsulation layer 420 is used to protect the side surfaces of the touch-sensing liquid crystal panel to prevent the side surfaces of the touch-sensing liquid crystal panel from being damaged during following processes. The encapsulation layer 420 is formed by using a peelable sealant, but embodiments of the present invention are not limited thereto.

It can be understood from the above descriptions that the fabrication method 300 of the touch-sensing liquid crystal panel uses the encapsulating steps 312 and 320 to form the encapsulation layers 410 and 420 to prevent the side surfaces of the touch-sensing liquid crystal panel from being damaged by the slimming step 140. The fabrication method 300 of the touch-sensing liquid crystal panel not only simplifies the production process of the touch-sensing liquid crystal panel but also follows design standards of thin-film transistors, so as to provide a more reliable touch-sensing liquid crystal panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fabrication method of a touch-sensing liquid crystal panel, the fabrication method comprising:
   fabricating a color filter substrate, the operation of fabricating the color filter substrate comprising:
      providing a first glass substrate having a first surface and a second surface opposite to the first surface;
      forming a sensing matrix on the first surface of the first glass substrate at a predetermined baking temperature, wherein the sensing layer is formed from indium tin oxide and a sheet resistance of the sensing layer is smaller than or equal to 30 ohm/square;
      forming a plurality of color filters on the second surface of the first glass substrate; and
      forming a common electrode layer on the color filters to form the color filter substrate;
   providing a transistor substrate, wherein the transistor substrate comprises:
      a second glass substrate; and
      a pixel layer formed on the second glass substrate, wherein the pixel layer comprises a plurality of pixel units, and each of the pixel units comprises a transistor switch and a pixel electrode;
   combining the color filter substrate with the transistor substrate and disposing a liquid crystal layer between the color filter substrate and the transistor substrate to form a liquid crystal panel; and
   performing a slimming process on the liquid crystal panel to slim the second glass substrate of the liquid crystal panel.

2. The fabrication method of claim 1, wherein each of the sensing matrix has a thickness ranging from 600 Angstroms to 1400 Angstroms.

3. The fabrication method of claim 1, wherein the baking temperature is greater than 230° C.

4. The fabrication method of claim 1, wherein the second glass substrate has thickness smaller than or equal to 0.2 mm after treated by the slimming process.

5. The fabrication method of claim 1, wherein the operation of fabricating the color filter substrate further comprises forming an encapsulation layer on the sensing matrix for protecting the sensing matrix.

6. The fabrication method of claim 1, wherein the operation of combining the color filter substrate with the transistor substrate comprises forming an encapsulation layer on a plurality of side surfaces of the liquid crystal panel to protect the side surfaces of the liquid crystal panel.

7. The fabrication method of claim 1, wherein the operation of forming the sensing matrix comprises a photolithography process to form a predetermined pattern on the sensing matrix.

8. A fabrication method of a touch-sensing liquid crystal panel, the fabrication method comprising:
   fabricating a color filter substrate, the operation of fabricating the color filter substrate comprising:
      providing a first glass substrate having a first surface and a second surface opposite to the first surface;
      forming a sensing matrix on the first surface of the first glass substrate at a predetermined baking temperature, wherein the sensing layer is formed from indium tin oxide and a sheet resistance of the sensing layer is smaller than or equal to 30 ohm/square; and
      forming a plurality of color filters on the second surface of the first glass substrate;
   providing a transistor substrate, wherein the transistor substrate comprises:
      a second glass substrate; and
      a pixel layer formed on the second glass substrate, wherein the pixel layer comprises a plurality of pixel units, and each of the pixel units comprises a transistor switch and a pixel electrode;
   combining the color filter substrate with the transistor substrate and disposing a liquid crystal layer between the color filter substrate and the transistor substrate to form a liquid crystal panel; and
   performing a slimming process on the liquid crystal panel to slim the second glass substrate of the liquid crystal panel.

9. The fabrication method of claim 8, wherein each of the sensing matrix has a thickness ranging from 600 Angstroms to 1400 Angstroms.

10. The fabrication method of claim 8, wherein the baking temperature is greater than 230° C.

11. The fabrication method of claim 8, wherein the second glass substrate has thickness smaller than or equal to 0.2 mm after treated by the slimming process.

12. The fabrication method of claim 8, wherein the operation of fabricating the color filter substrate further comprises forming an encapsulation layer on the sensing matrix for protecting the sensing matrix.

13. The fabrication method of claim 8, wherein the operation of combining the color filter substrate with the transistor substrate comprises forming an encapsulation layer on a plurality of side surfaces of the liquid crystal panel to protect the side surfaces of the liquid crystal panel.

14. The fabrication method of claim 8, wherein the operation of forming the sensing matrix comprises a photolithography process to form a predetermined pattern on the sensing matrix.

15. A fabrication method of a touch-sensing liquid crystal panel, the fabrication method comprising:

fabricating a color filter substrate, the operation of fabricating the color filter substrate comprising:
  providing a first glass substrate having a first surface and a second surface opposite to the first surface;
  forming a sensing matrix on the first surface of the first glass substrate at a predetermined baking temperature, wherein the sensing layer is formed from indium tin oxide and a sheet resistance of the sensing layer is smaller than or equal to 30 ohm/square; and
  forming a plurality of color filters on the second surface of the first glass substrate;
providing a transistor substrate, wherein the transistor substrate comprises:
  a second glass substrate; and
  a pixel layer formed on the second glass substrate, wherein the pixel layer comprises a plurality of pixel units, and each of the pixel units comprises a transistor switch and a pixel electrode; and
combining the color filter substrate with the transistor substrate and disposing a liquid crystal layer between the color filter substrate and the transistor substrate to form a liquid crystal panel.

16. The fabrication method of claim 15, wherein each of the sensing matrix has a thickness ranging from 600 Angstroms to 1400 Angstroms.

17. The fabrication method of claim 15, wherein the baking temperature is greater than 230° C.

18. The fabrication method of claim 15, wherein the second glass substrate has thickness smaller than or equal to 0.2 mm.

19. The fabrication method of claim 15, wherein the operation of fabricating the color filter substrate further comprises forming an encapsulation layer on the sensing matrix for protecting the sensing matrix.

20. The fabrication method of claim 15, wherein the operation of combining the color filter substrate with the transistor substrate comprises forming an encapsulation layer on a plurality of side surfaces of the liquid crystal panel to protect the side surfaces of the liquid crystal panel.

* * * * *